United States Patent
Bartlok et al.

(10) Patent No.: US 9,328,745 B2
(45) Date of Patent: May 3, 2016

(54) PRESSURE STORAGE SYSTEM AND METHOD TO OPERATE PRESSURE STORAGE SYSTEM

(71) Applicant: MAGNA STEYR Fahrzeugtechnik AG & Co KG, Graz (AT)

(72) Inventors: Guido Bartlok, Graz (AT); Franz Mayr, St. Marein bei Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 218 days.

(21) Appl. No.: 14/072,730

(22) Filed: Nov. 5, 2013

(65) Prior Publication Data
US 2014/0124039 A1 May 8, 2014

(30) Foreign Application Priority Data

Nov. 5, 2012 (EP) .................................... 12191303

(51) Int. Cl.
*F16K 17/00* (2006.01)
*F15B 1/04* (2006.01)
*F17C 5/06* (2006.01)

(52) U.S. Cl.
CPC ... *F15B 1/04* (2013.01); *F17C 5/06* (2013.01); *F17C 2205/0134* (2013.01); *F17C 2205/037* (2013.01); *F17C 2205/0335* (2013.01); *F17C 2221/012* (2013.01); *F17C 2221/033* (2013.01);
(Continued)

(58) Field of Classification Search
CPC G05D 16/103; F16K 13/00; Y10T 137/2562; Y10T 137/2564; Y10T 137/2572; Y10T 137/2569; Y10T 137/4673; Y10T 137/7808

USPC .......................................... 141/197, 301, 302
See application file for complete search history.

(56) References Cited

U.S. PATENT DOCUMENTS 3,890,999 A * 6/1975 Moskow ............... F16K 31/363
137/484.4
4,380,242 A * 4/1983 Bresie ....................... F17C 7/00
137/113

(Continued)

FOREIGN PATENT DOCUMENTS

DE 10 2009 049687 A1 4/2011
EP 1146277 A 10/2001

(Continued)

OTHER PUBLICATIONS

Translation of JP 2005-207561 A. Translation conducted on Oct. 20, 2015.*

(Continued)

*Primary Examiner* — R. K. Arundale
(74) *Attorney, Agent, or Firm* — Jordan IP Law, LLC; Todd A. Vaughn

(57) ABSTRACT

A pressure accumulator system, and a method of operating a pressure accumulator system. The method includes operatively connecting a tank neck to at least two pressure accumulator vessels having different admissible operating pressures, in which at least one of the pressure accumulator vessels has an admissible operating pressure lower than a maximum applicable pressure at the tank neck, simultaneously filling via the tank neck the at least two pressure accumulator vessels with a fluid medium, and preventing an inadmissible pressure rise in the pressure accumulator vessels with the lower admissible operating pressure during the simultaneous filling.

9 Claims, 9 Drawing Sheets

(52) U.S. Cl.
CPC ... *F17C 2221/035* (2013.01); *F17C 2223/0123* (2013.01); *F17C 2223/0153* (2013.01); *F17C 2223/0161* (2013.01); *F17C 2223/033* (2013.01); *F17C 2223/036* (2013.01); *F17C 2225/0123* (2013.01); *F17C 2225/036* (2013.01); *F17C 2227/04* (2013.01); *F17C 2250/01* (2013.01); *F17C 2265/065* (2013.01); *F17C 2270/0178* (2013.01); *F17C 2270/0184* (2013.01); *Y02E 60/321* (2013.01); *Y10T 137/0396* (2015.04); *Y10T 137/7808* (2015.04); *Y10T 137/8733* (2015.04)

(56) References Cited

U.S. PATENT DOCUMENTS

| | | | | |
|---|---|---|---|---|
| 7,325,561 | B2* | 2/2008 | Mathison | B60K 15/00 137/256 |
| 8,443,820 | B2* | 5/2013 | Ulrey | F02M 21/0224 137/1 |
| 8,534,327 | B2* | 9/2013 | Inagi | F17C 5/06 141/197 |
| 8,991,445 | B2* | 3/2015 | Nakazawa | H01M 8/04201 141/197 |
| 2006/0246177 | A1* | 11/2006 | Miki | F17C 5/007 426/24 |
| 2009/0250138 | A1* | 10/2009 | Bavarian | F17C 7/00 141/4 |
| 2010/0193045 | A1* | 8/2010 | Xu | F17C 5/06 137/255 |

FOREIGN PATENT DOCUMENTS

| | | |
|---|---|---|
| EP | 1 653 148 A1 | 5/2006 |
| JP | H09-257195 A | 9/1997 |
| JP | 2001-295994 A | 10/2001 |
| JP | 2005-207561 A | 8/2005 |
| JP | 2007 170443 A | 7/2007 |
| JP | 2011-074925 A | 4/2011 |
| JP | 2011-220441 A | 11/2011 |
| JP | 2012-77789 A | 4/2012 |
| WO | 2009/006852 A1 | 1/2009 |
| WO | 2011/049466 A1 | 4/2011 |
| WO | 2011/138826 A1 | 11/2011 |

OTHER PUBLICATIONS

Korean Patent Application No. 10-2013-132749 Notice of Preliminary Rejection, Feb. 9, 2015, 5 pages, Korean Intellectual Property Office, Korea (English translation included).

Kentaro Yuuki, Japanese Patent Application No. 2013-227823 Notice of Reasons for Rejection, Sep. 30, 2014, 2 pages, Japanese Patent Office, Japan (English Abstract Submitted).

* cited by examiner

PRESSURE STORAGE SYSTEM AND METHOD TO OPERATE PRESSURE STORAGE SYSTEM

CROSS-REFERENCE TO RELATED APPLICATIONS

The present application claims priority 35 U.S.C. §119 to European Patent Publication No. EP 12191303.2 (filed on Nov. 5, 2012), which is hereby incorporated by reference in its entirety.

TECHNICAL FIELD

Embodiments relate to a pressure accumulator system and to a method for operating a pressure accumulator system.

BACKGROUND

Devices may be used for example in the form of tanks or tank systems of motor vehicles in order to prevent overfilling of individual pressure accumulator vessels with fuel during a refueling or filling process. After the filling process, the fuel must be withdrawn again in order to be consumed. Various arrangements of pressure accumulator vessels and valves, and methods for the operation thereof, are known for this purpose.

Specifically, in the case of motor vehicles that are operated with natural gas or hydrogen, a large travelling range is desired on the one hand, but on the other hand, there may me often only limited space available for the installation of the pressure accumulator vessels, such that it may me often advantageous for multiple pressure accumulator vessels of different capacity to be accommodated at different locations in the vehicle. It is also true, however, in the case of static plants, in particular in the case of working machines, that a long service life may me desired but there may me often only limited space available.

German Patent Publication No. DE 10 2009 049687 A1 discloses a gas vessel arrangement for a gas engine having multiple gas vessels, and a method for the operation of a gas vessel arrangement of the type. The gas vessel arrangement for a gas engine has multiple gas vessels, wherein each of the multiple gas vessels may me assigned in each case at least one valve device; a common gas line which may me connected at one side to the multiple gas vessels and at the other side to a filler neck and to the gas engine, and a control device for the actuation of the valve devices of the multiple gas vessels. The gas vessels may optionally have identical or different volumes. The purported advantages of the arrangement and operating method, however, come to bear in particular in the case of different gas vessel volumes or asymmetrical arrangements of the gas vessels and of the gas lines.

The gas vessel arrangement of DE 10 2009 049687 A1 is characterized in that a control device is designed to at least temporarily actuate the valve devices of the multiple gas vessels such that a first gas vessel and a second gas vessel are connected to one another such that gas can flow between the first and the second gas vessel for the purposes of pressure equalization. In the method, likewise described in DE 10 2009 049687 A1, for operating a gas vessel arrangement for a gas engine having multiple gas vessels, a highly compressed gas is delivered from at least one storage tank simultaneously into the multiple gas vessels. During a refueling process of the gas vessel arrangement, the valve devices of a first gas vessel and of a second gas vessel are at least temporarily opened in order to connect the first and the second gas vessel to one another such that gas can flow between the first and the second gas vessel for the purposes of pressure equalization.

The two gas vessels are connected via a common gas line both to the gas engine and also to a filler neck. The latter can be connected via a corresponding fuelling hose in order for the gas vessels of the gas vessel arrangement to be filled with a highly compressed gas, for example natural gas from one or more storage vessels of a natural gas refueling facility. The filler neck is equipped with a tank flap switch that detects an opening and closing of the tank flap of the filler neck. The tank flap switch may optionally also be designed to detect the presence of a fuelling nozzle in the open filler neck, and an electronic bus connection via the filler hose permits communication between the filling station and a control device in the vehicle.

DE 10 2009 049687 A1 is one representative of a number of known systems of combined pressure accumulator vessels and valve arrangements which make it possible for pressure accumulator systems to be filled with fluids and for the fluids to be withdrawn from the pressure accumulator systems. Furthermore, numerous further technical facilities are known which enable a fill pressure of an individual pressure accumulator vessel or of an entire pressure accumulator system to be monitored and limited through measurement of the pressure and through electronic control of electromagnetic valves.

In the applications mentioned, it may me desirable for an admissible operating pressure of a pressure accumulator vessel or of a pressure accumulator system to be reliably adhered to during the course of a filling process, and thus for maximum operational safety to be ensured. It should be possible for the filling process to be performed as quickly as possible and with only low energy losses. Wear on valve components should be kept low, and damage to pressure accumulator vessels and pressure lines should be prevented. Furthermore, it may me desirable for the piping of the pressure accumulator systems to be simplified, and for the number and complexity of the pressure lines to be reduced.

Pressure accumulator vessels for mobile applications are adapted in terms of design, and constructed, for the corresponding pressure level depending on the type of application. This gives rise to accumulators which, with regard to their strength, correspond to the operating pressure and satisfy the ECE guidelines and which, in the case of high-pressure systems, for example, above 200 bar, take up a corresponding amount of space. Small pressure accumulator vessels with the same admissible operating pressure in each case, or modularly assembled component pressure accumulators with equal admissible operating pressure, are thus of relatively very large construction and relatively expensive, and therefore have not hitherto become established. Furthermore, in conventional systems and methods, there is no adequately reliable technical solution that permits the simultaneous filling of pressure accumulator vessels with different admissible operating pressures from the same tank neck.

In accordance with the presently applicable legal regulations, all pressure accumulator vessels of a system must be configured to have an identical admissible operating pressure (maximum operating pressure). It is presently also prohibited to refuel at filling stations whose filling pressure (fuelling pressure) exceeds the maximum working pressure of the pressure accumulator vessels installed in a motor vehicle.

SUMMARY

Embodiments relate to an enhanced pressure accumulator system(s), and in particular, to combined valve arrangements which, to some extent also without electrical and electronic components, ensure the safety of systems of pressure accumulator vessels with different admissible operating pressures.

Embodiments relate to an enhanced method(s) for operating pressure accumulator systems, which methods permit increased operational safety.

In accordance with embodiments, a method for operating a pressure accumulator system includes at least one of: simultaneously filling using a single tank neck at least two pressure accumulator vessels having different admissible operating pressures in which at least one pressure accumulator vessel has an admissible operating pressure that is less than a maximum pressure applicable at a tank neck, and preventing an inadmissible pressure rise in the at least one pressure accumulator vessel with a lower admissible operating pressure using at least one upstream device that has a shut-off pressure defined by the lower admissible operating pressure.

In accordance with embodiments, a method for operating a pressure accumulator system includes at least one of: simultaneously filling at least two pressure accumulator vessels having different admissible operating pressures with a fluid medium.

In accordance with embodiments, a method for operating a pressure accumulator system includes at least one of: operatively connecting a tank neck to at least two pressure accumulator vessels having different admissible operating pressures, in which at least one of the pressure accumulator vessels has an admissible operating pressure lower than a maximum applicable pressure at the tank neck; simultaneously filling via the tank neck the at least two pressure accumulator vessels with a fluid medium; and preventing an inadmissible pressure rise in the pressure accumulator vessels with the lower admissible operating pressure during the simultaneous filling.

Through the combined use of mechanically actuated shut-off valves, pressure shut-off valve units, check valves and electromagnetic valves for activation and deactivation, it is possible to implement any desired levels of admissible operating pressures in different pressure accumulator systems or parts of pressure accumulator systems, such that smaller, or else thinner-walled, cheaper accumulators can be used. Furthermore, in this way, it is made possible to use free-form accumulators which, in addition to the main accumulators, utilize existing cavities in and on a motor vehicle or a working machine and thereby increase the vehicle travelling range or operating duration.

In accordance with embodiments, a pressure accumulator system includes at least one of: a tank neck; at least two pressure accumulator vessels in which at least one of the pressure accumulator vessels has an admissible operating pressure that is less than a maximum pressure that can be applied at the tank neck; pressure lines and at least one withdrawal point; and at least one upstream device having a shut-off pressure defined by the lower admissible operating pressure and which is configured to prevent an inadmissible pressure rise in the at least one pressure accumulator vessel with a lower admissible operating pressure.

In accordance with embodiments, a pressure accumulator system includes at least one of: a tank neck; pressure accumulator vessels, at least one of the pressure accumulator vessels having an admissible operating pressure lower than a maximum applicable pressure at the tank neck; and at least one device having a shut-off pressure defined by the lower admissible operating pressure and which is configured to prevent an inadmissible increase in pressure at the pressure accumulator vessels.

In accordance with embodiments, the upstream device may be, for example, at least one of: a shut-off valve, a pressure shut-off valve unit, or an electromagnetically actuable cut-off valve, each in operative connection with an electronic pressure measurement device and a control unit, or else a combination of the stated devices that can be connected upstream.

Advantageously, the use of devices that monitor a defined shut-off pressure purely mechanically, wherein the devices are permanently operatively connected to individual pressure accumulator vessels and/or subregions of a pressure accumulator system, yields a high level of protection against misfuelling and provides effective protection against an inadmissible pressure rise in individual pressure accumulator vessels. Systems that perform monitoring purely electronically may bring about dangerous states in pressure accumulator systems due to erroneous pressure measurements and/or switching processes at electromagnetic valves. In accordance with embodiments, mechanical and electrical/electronic components may be used together, as additional safety devices, in pressure accumulator systems.

Embodiments relate to a method for operating a pressure accumulator system that includes at least one of: simultaneously filling at least two pressure accumulator vessels that have different admissible operating pressures via the same tank neck.

In accordance with embodiments, the tank neck may have mechanical dimensions and/or other coding devices such that the tank neck may be connected to all fuelling devices that provide fuel/medium up to a maximum fuelling pressure (in the future, for example, 700 or 900 bar) available at filling stations or other refueling facilities. The device (for example, shut-off valve/pressure shut-off valve unit) that is connected downstream of the tank neck and upstream of the pressure accumulator system protects pressure accumulator vessels with a lower admissible operating pressure against an inadmissible pressure rise.

Embodiments relate to a method for operating a pressure accumulator system that includes one of: withdrawing a medium from the pressure accumulator system by automatically opening shut-off valves and/or pressure shut-off valve units connected upstream of pressure accumulator vessels having a lower admissible operating pressure, as a function of a pressure decrease in the pressure accumulator system, and in accordance with the shut-off pressure defined for the respective shut-off valves and/or pressure shut-off valve units.

With suitable arrangement of shut-off valves and/or pressure shut-off valve units, it is possible, without electronic pressure measurement and control, for fuel media/fuel to be withdrawn from parts of the pressure accumulator system with different admissible operating pressure.

In accordance with embodiments, the upstream device that has a shut-off pressure defined by a lower admissible operating pressure may be, for example, a shut-off valve for a pressure accumulator vessel for a medium, in which a valve housing has a valve chamber with a feed opening and with an outlet opening which faces toward the pressure accumulator vessel, a piston, and at least one spring, wherein the piston has at least one axial connecting duct and is guided in an axially movable manner by at least two sealing elements arranged in the valve chamber, wherein a first piston active surface, which faces towards an inlet region of the valve chamber, of the piston and a sealing body or the valve housing form a valve seat, and wherein, as a result of a change in the pressure in an accumulator region, which adjoins a second piston active surface, of the valve chamber, the piston may be axially moved and a passage opening arranged between the feed opening and the outlet opening can be reversibly closed and opened, wherein, in the unpressurized state, the passage opening is held open by the spring.

Advantageously, this results in a purely mechanical shut-off valve which, due to a set spring force, sealingly closes off the passage opening when a pressure exceeds a predetermined value, and which does not open either in the case of a further increase in pressure, or in the case of a further decrease in pressure down to negative pressure, in the feed opening, and which thus always remains closed. The withdrawal of medium takes place at one or more other locations in the pressure accumulator system.

In accordance with embodiments, an upstream device that has a shut-off pressure defined by a lower admissible operating pressure may be, for example, a pressure shut-off valve unit for a pressure accumulator vessel for a medium, wherein a valve housing has a valve chamber with a feed opening and with an outlet opening which faces toward the pressure accumulator vessel, a piston, and at least one spring, wherein the piston has at least one axial connecting duct and is guided in an axially movable manner by at least two sealing elements arranged in the valve chamber, wherein a first piston active surface, which faces towards an inlet region of the valve chamber, of the piston and a sealing body or the valve housing form a valve seat, and wherein, as a result of a change in the pressure in an accumulator region, which adjoins a second piston active surface, of the valve chamber, the piston may be axially moved and a passage opening arranged between the feed opening and the outlet opening can be reversibly closed and opened, wherein, in the unpressurized state, the passage opening is held open by the spring, and wherein the accumulator region of the valve chamber is arranged such that it can be connected to the inlet region via a withdrawal duct and via a withdrawal valve.

Advantageously, this results in a purely mechanical pressure shut-off valve unit which, due to a set spring force, sealingly closes off the passage opening when a pressure exceeds a certain value, and which does not open either in the case of a further increase in pressure, or in the case of a further decrease in pressure down to negative pressure, in the feed opening, and which thus always remains closed.

The withdrawal of medium from the pressure accumulator vessel takes place via a withdrawal duct and a withdrawal valve which is arranged such that it can be connected to an inlet region, or else at one or more other locations in the pressure accumulator system.

The advantage, in accordance with embodiments, of the mechanical pressure shut-off valve unit during the filling process is that a downstream pressure accumulator system reaches only the pressure that is desired, and, regardless of the pressure upstream of the pressure shut-off valve unit and without an electromagnetic actuator, the pressure shut-off valve unit always remains reliably closed and thus reliably maintains the pressure in the downstream pressure accumulator system and does not permit a further increase in pressure as a result of a follow-on inflow of medium.

A further advantage of the valve is that, although the downstream pressure accumulator system may be subjected to an undesirable increase in pressure in the event of leaks at the sealing seat between the piston and sealing body or valve housing, an increase in pressure on the outlet side causes the pressing force of the piston against the sealing body or the valve housing to increase, and thus the leak is reduced again.

A particularly advantageous effect results from the fact that, in the unpressurized state, the passage opening is held open by the force of the spring. Accordingly, it is possible for the medium to flow unhindered into the pressure accumulator vessel up to the end phase of the refueling process, and damaging vibrations in the region of the valve chambers are prevented.

If the pressure in the feed opening falls below the pressure in the accumulator region, the withdrawal valve can be opened, and medium flows from the accumulator region through the withdrawal duct to the feed opening. In this way, a withdrawal of medium from the downstream pressure accumulator vessel or system via the feed line is made possible. This facilitates the use of additional pressure accumulator vessels and considerably simplifies the piping of pressure accumulator systems.

In accordance with embodiments, the withdrawal valve of the pressure shut-off valve unit may be in the form of a ball valve or cone valve which may be held closed in an unpressurized state by an actuating spring. The actuating spring may be arranged on that side of the withdrawal valve which faces towards the inlet region. In this way, the withdrawal valve is closed by the actuating spring when an overpressure prevails in the feed opening, and is also permanently closed by the actuating spring in an unpressurized state. If the pressure in the feed opening falls below the pressure in the accumulator region, it is possible, depending on the spring force of the actuating spring, for the withdrawal valve to open, and medium flows from the accumulator region through the withdrawal duct back to the feed opening.

In accordance with embodiments, in the pressure shut-off valve unit, the spring force of the actuating spring can be adjusted by way of a spring fixing screw. The great advantage of this arrangement is that, through the possibility of adjusting the spring force, the withdrawal valve opens again at a pressure lower, by any desired extent, than the shut-off pressure of the pressure shut-off valve unit. It is thus also possible, however, to set the time, and the pressure level in the accumulator region of the valve chamber, upon which the pressure shut-off valve unit opens.

In accordance with embodiments, in the pressure shut-off valve unit, the spring fixing screw is arranged coaxially with the actuating spring and has an axial duct formed as a throttle. This permits a damped activation of a flow of medium from the accumulator region of the valve chamber to the feed opening through the throttle point in the duct of the spring fixing screw, and thus a slow pressure dissipation in the accumulator region. Pressure peaks in the region of the feed opening are prevented.

In accordance with embodiments, the withdrawal duct and the withdrawal valve may be arranged so as to be integrated in the valve housing. This permits a space-saving design, and both the production and the assembly and also the mounting of the pressure shut-off valve unit in pressure accumulator systems are simplified.

In accordance with embodiments, the withdrawal duct and the withdrawal valve may be arranged so as to be integrated in the piston. This permits a space-saving design, and both the production and the assembly and also the mounting of the pressure shut-off valve unit in pressure accumulator systems are simplified.

In accordance with embodiments, the first piston active surface and the sealing body or the valve housing of the shut-off valve and/or of the pressure shut-off valve unit may be configured such that, when the piston is in a closed position, a sealing action is generated at a sealing edge in the region of the outer rim of the first piston active surface.

"Outer rim" here means situated radially at the outside as viewed from the axis of the piston. The outer rim of the piston may for example be obliquely chamfered in the region of the first piston active surface. It is also possible for the first piston active surface to have an elevated bead at the outer rim in order to localize the sealing action in the region.

In this way, if a shut-off pressure is exceeded or if the pressure rises above the shut-off pressure, the piston no longer has a force exerted on it counter to the closing direction of the piston. The shut-off pressure and the closing behaviour of the shut-off valves and/or pressure shut-off valve units according to the invention are thus independent of the pressure in the feed opening. Furthermore, when the valve is closed, even in the event of a pressure rise in the feed opening, no axial force can be exerted on the piston by the pressure in the feed opening, and the shut-off valve and/or the pressure shut-off valve unit remains safely closed even in the event of extreme pressure shocks.

It is furthermore ensured that the shut-off valve and/or the pressure shut-off valve unit remains closed even when the pressure in the feed opening falls below the shut-off pressure at which the piston has previously closed, because the now continuously acting closing force is determined substantially only by the pressure, acting on the piston active surface, in the accumulator region of the valve chamber minus the spring force of the spring.

By virtue of the fact that the feed opening issues into the inlet region of the valve chamber preferably radially outside the piston active surface, it is additionally ensured that no axial force can be exerted on the piston by the pressure in the feed opening.

The second piston active surface may be formed so as to have a greater surface area than the first piston active surface. By way of a relatively large second piston active surface area, it is possible to realize smaller values for the shut-off pressure of the shut-off valves and/or pressure shut-off valve units.

In accordance with embodiments, the piston may have a cylindrical geometric shape or cross-section, and on its outer side, has sliding surfaces in at least two regions with different diameters.

In accordance with embodiments, the at least two sealing elements may be arranged in corresponding recesses in the valve housing. A cost-effective variant would be for the sealing elements to be accommodated in in each case one groove in the piston. Sealing elements arranged in grooves on the piston have proven to be problematic in the case of very high pressures (such as, for example, 200 to 1000 bar). As a function of the pressure, a variable force is exerted on the piston, thus influencing the shut-off pressure of the shut-off valves and/or pressure shut-off valve units. With such an arrangement of the seals in recesses or grooves in the valve housing, in particular in cylindrical sections of the valve chamber, the pressure of the medium does not exert a variable force on the piston, the shut-off valve and/or the pressure shut-off valve unit remain reliably closed.

The sealing body and/or the piston may be produced from an elastically deformable material. By way of a material selection suited to the very high pressures (such as, for example, 200 to 1000 bar), the sealing action is optimized and wear on the valve seat is prevented. Particularly suitable materials include plastics such as PEEK and PAS or ceramic materials such as aluminium oxide and silicon carbide, or else special steels and other metals. The shut-off valves and/or pressure shut-off valve units need not have separate sealing bodies. It is also possible for the piston to impart a sealing action directly against the valve housing. Preferred material combinations are familiar to a person skilled in the art.

A relief region of the valve chamber, the relief region being arranged between the inlet region and the accumulator region of the valve chamber, may have a relief opening between the at least two sealing elements. In this way, the fluid medium that escapes in the event of leaks at one of the sealing elements cannot lead to a pressure increase in the respective other region of the valve chamber.

In accordance with embodiments, the relief opening may be connected to a line for discharging escaping medium. In this way, any escaping (combustible) medium may be removed from the direct vicinity of the shut-off valves and/or pressure shut-off valve units and processed further at low pressure at a suitable location without risk to people.

In accordance with embodiments, the shut-off pressure of the shut-off valves and/or pressure shut-off valve units may substantially correspond, directly correlate to, or is otherwise substantially determined by the spring force of the spring and by the piston active surfaces. The spring force of the spring may be dimensioned, in coordination with the piston active surfaces, such that, in the case of rising pressure in the accumulator region, after a predetermined shut-off pressure of the shut-off valves and/or pressure shut-off valve units is exceeded, reliably closes and remains closed. The friction at the sealing elements likewise may also play a role in the dimensioning of the spring force.

In accordance with embodiments, the spring force of the spring may be adjusted by the way the cover is attached, and particularly, by way of the depth the cover is screwed in. In this way, it is for example possible for differences in the friction between the piston and sealing elements, resulting, for example, from manufacturing tolerances, to be compensated during assembly.

In accordance with embodiments, in the shut-off valves or pressure shut-off valve units, spacers may be provided on and/or over the cover of the valve housing, or corresponding recesses are provided on and/or over the second piston active surface of the piston. Advantageously, enhanced pressure distribution over the second piston active surface of the piston is achieved in this way.

It is also expedient if the valve housing, at the end which has the outlet opening, projects at least partially into an opening of the pressure accumulator vessel and is thus permanently connected to the pressure accumulator vessel. In this embodiment, the shut-off valve or the pressure shut-off valve unit may be arranged in a space-saving manner, and so as to be protected against mechanical forces, in the interior of a pressure accumulator vessel. Alternatively, the outlet opening may be permanently connected to the pressure accumulator vessel via a pressure line. In this way, the installation position of a shut-off valve, for example, in a tank neck, or of a pressure shut-off valve unit is made substantially independent of the installation position of the pressure accumulator vessel.

In accordance with embodiments, in the shut-off valves or pressure shut-off valve units, the outlet opening may be configured for connection to the pressure accumulator vessel via a valve-holding block or via an accumulator valve block that has at least one additional valve. Accumulator valve blocks are known and are structural units that combine multiple valve functions in a compact housing and which may be fixedly connected to an opening of a pressure accumulator vessel. In this way, it is possible in a modular and space-saving manner for the shut-off function of the shut-off valves and/or pressure shut-off valve units which serve for protection against overfilling to be enhanced to include further functions.

In accordance with embodiments, in the shut-off valves or pressure shut-off valve units, an overpressure valve may be arranged between the accumulator region and the relief region of the valve chamber, the predetermined opening pressure of which overpressure valve is greater than the predetermined shut-off pressure of the shut-off valve or of the pressure shut-off valve unit.

In accordance with embodiments, the overpressure valve may be arranged so as to be integrated in the piston. The operational safety of the pressure accumulator system may be increased in this way. Since the shut-off valve or the pressure shut-off valve unit remains closed, a pressure rise caused, for example, by the action of external forces or by other external influences, for example, overheating of the medium caused by a fire, with an associated pressure rise in the pressure accumulator vessel, would, without the provision of such an overpressure valve, lead to destruction of the pressure accumulator vessel or of individual downstream components. A combination of shut-off valve/pressure shut-off valve unit and overpressure valve in a common valve housing may also be provided.

The shut-off valves and pressure shut-off valve units in accordance with embodiments may be particularly suitable for various media such as hydrogen, methane, natural gas or a mixture of hydrogen and natural gas. With corresponding modifications, use with liquefied gas (LPG) and other liquid media is also possible.

Using the shut-off valves and/or pressure shut-off valve units in accordance with the invention, on their own and also in combination with electromagnetically actuable cut-off valves, it may be possible for multiple pressure accumulator vessels with different admissible operating pressures to be connected such that, in order to protect the respective pressure accumulator vessel against overfilling, those pressure accumulator vessels which have an admissible operating pressure lower than a (relatively high) fill pressure that is conventional or provided for the entire system have connected upstream thereof a shut-off valve, which is designed for the respective admissible operating pressure of the respective pressure accumulator vessel, or a pressure shut-off valve unit.

This serves to provide increased protection against overfilling during a refueling process and permits the use of additional, more cost-effective pressure accumulator vessels with lower admissible pressure levels. It is also made possible in this way, however, in the case of an existing system, for the storage capacity of a pressure accumulator system that is provided to be massively increased in a cost-effective manner with an auxiliary system and a higher pressure level.

The pressure accumulator system in accordance with embodiments may be configured such that at least one pressure accumulator vessel has a predetermined admissible operating pressure lower than a predetermined admissible operating pressure of at least one further pressure accumulator vessel in the pressure accumulator system. Pressure accumulator vessels with a lower admissible operating pressure are more cost-effective than pressure accumulator vessels with a higher admissible operating pressure.

In accordance with embodiments, a pressure accumulator system has at least one pressure shut-off valve unit which comprises a shut-off valve, a check valve and an overpressure valve, wherein the valves may be arranged in a common valve housing. This permits particularly space-saving installation of the pressure accumulator system, for example, in a vehicle.

In accordance with embodiments, in a pressure accumulator system, at least one shut-off valve and/or at least one pressure shut-off valve unit may be arranged in series with respect to one another. This permits, in conjunction with branched pressure lines, the modular construction of extensive pressure accumulator systems.

In accordance with embodiments, in a pressure accumulator system, at least one shut-off valve and/or at least one pressure shut-off valve unit may be arranged parallel to one another. This permits, in conjunction with branched pressure lines, the modular construction of extensive pressure accumulator systems.

In accordance with embodiments, in a pressure accumulator system, at least one shut-off valve and/or at least one pressure shut-off valve unit may be configured to protect a downstream subregion of the pressure accumulator system with at least two pressure accumulator vessels against an inadmissible pressure rise. The at least two pressure accumulator vessels may be arranged in parallel and/or in series with respect to one another. Here, "arranged in series" means that, when a pressure accumulator vessel is being filled with medium or medium is being withdrawn from a pressure accumulator vessel, the medium flows sequentially through one or more further pressure accumulator vessels. The embodiments, too, in conjunction with branched pressure lines, permit the modular construction of extensive pressure accumulator systems.

In accordance with embodiments, in a pressure accumulator system, at least one pressure accumulator vessel may be assigned at least one electromagnetically actuable cut-off valve that may be controlled by a control unit. The electromagnetically actuable cut-off valve may particularly be in the form of an automatic cylinder valve (ACV). An automatic cylinder valve is a valve which is actuated electrically (usually by way of a magnet) and which can be opened and closed. In such pressure accumulator systems, the valve is often referred to as "shut-off valve" or gas-pressure shut-off valve. Electromagnetically actuable cut-off valves in valve arrangements generally serve for the opening and closing of pressure accumulator vessels. The electromagnetically actuable cut-off valves are conventionally designed so as to be closed when their actuating mechanism is in a deenergized state. The expression used here ACV, automatic cylinder valve, originates from an ECE guideline that uses this expression for a valve of the type. The ACV can shut off/open a downstream pressure accumulator vessel independently of the prevailing pressure, and ensures additional safety during the operation of pressure accumulator systems.

In accordance with embodiments, if, in pressure accumulator systems, at least one pressure shut-off valve unit (PSV) is arranged between at least one electromagnetically actuable cut-off valve and a pressure accumulator vessel that is assigned to the at least one electromagnetically actuable cut-off valve. Here, too, the electromagnetically actuable cut-off valve may particularly be in the form of an automatic cylinder valve (ACV). The ACV permits a selective connection and disconnection of the pressure accumulator vessel connected downstream of the pressure shut-off valve unit, and ensures additional safety. The direct series connection of PSV and ACV without interposed pressure lines permits a space-saving construction.

In accordance with embodiments, at least one electronic pressure measurement device may be arranged at at least one location in the pressure accumulator system between tank neck and withdrawal point, wherein the at least one electronic pressure measurement device may be operatively connected, via an electrical measurement line, to a control unit. The pressure measurement by way of an electronic pressure measurement device, in particular by way of a high-pressure sensor, permits the use of a (simpler) shut-off valve instead of a pressure shut-off valve unit, and provides not only measurement values for the present pressure at different locations in the pressure accumulator system but also measurement data for the superordinate control of the entire system (for example, vehicle or working machine).

A "refueling process" involving multiple pressure accumulator vessels encompasses in particular the period of time in which the highly compressed gas is delivered into the pressure accumulator vessels. "Simultaneous refueling," for example at one fueling pump of a natural-gas refueling facility (filling station), of multiple pressure accumulator vessels is the opposite to a sequential refueling of the pressure accumulator vessels. Accordingly, the refueling of the multiple pressure accumulator vessels takes place via parallel feed lines which are coupled to a common filler/tank neck, such that the highly compressed gas can be fed simultaneously/in parallel to the multiple pressure accumulator vessels, and, when the respective admissible operating pressure of a pressure accumulator vessel protected by way of an SV or PSV is reached, the line branch is blocked.

DRAWINGS

Embodiments will be illustrated by way of example in the drawings and explained in the description below.

DESCRIPTION

Figure 1:
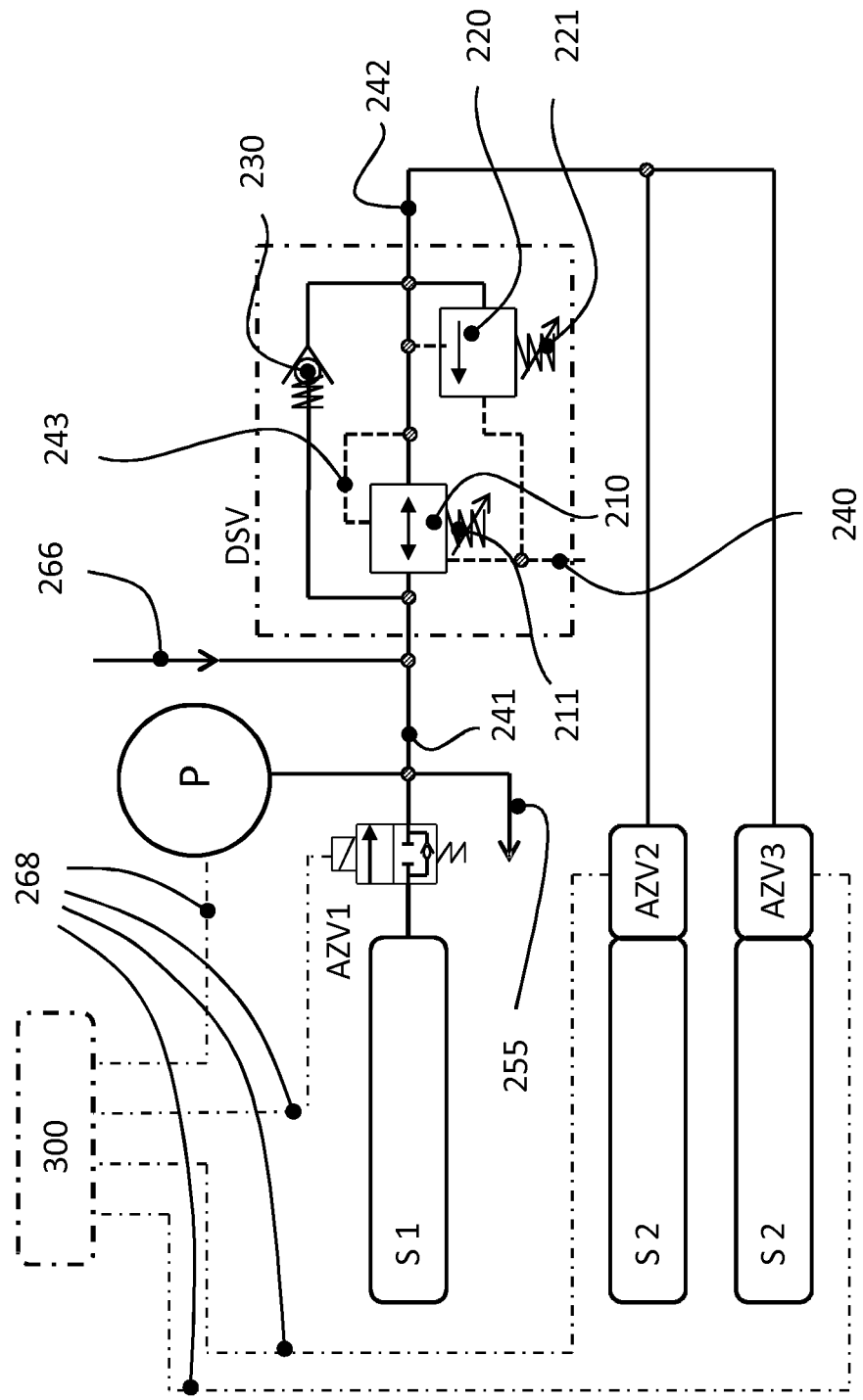
FIG. 1 illustrates a circuit diagram for different pressure levels in main and secondary accumulators.

FIG. 1 illustrates, by way of example, a circuit diagram for different pressure levels in main and secondary accumulators. The system includes a main accumulator S1 with a relatively high admissible operating pressure and with an automatic cylinder valve ACV1, and two secondary accumulators S2 with equal admissible operating pressure and with automatic cylinder valves ACV2 and ACV3, the admissible operating pressure of which secondary accumulators lies below the admissible operating pressure of the main accumulator.

The initial situation upon refueling of the system is such that the pressure shut-off valve 210 in the pressure shut-off valve unit PSV, with a spring force 211 set in a desired manner, is open in a throughflow direction, and thus the medium can flow to the downstream pressure accumulator system. On the pressure accumulator vessels, ACVs are used which, to the pressure accumulator vessel, have an internal bypass which permits refueling but which, in a deenergized state, does not permit a withdrawal from the pressure accumulator vessel. When a defined pressure is reached in the control line 243, the shut-off valve closes the inflow path from the pressure line 241, counter to the set spring force 211. The refueling of the main accumulator S1 is continued. The pressure monitoring is performed by means of a pressure sensor P and a control unit 300. A significantly higher pressure can prevail in the pressure line 241 than in the line 242 and in the secondary accumulators S2. Arranged parallel with respect to the flow duct in the shut-off valve is a spring-loaded check valve 230 which, due to the spring force, is permanently closed in the initial situation, and thus during refueling.

For the withdrawal of the stored medium, ACV1 may be opened electrically, and the fluid medium may flow into the withdrawal line. If the pressure in the main accumulator S1 falls below the pressure level of the secondary accumulators as a result of the withdrawal of medium, the check valve 230 opens. When the pressure in the line 242 falls below the set value corresponding to the spring force 211, the shut-off valve also opens, and opens up the connection to the line 241 again. By measurement of the pressure level in the main accumulator S1 by way of the pressure sensor P, ACV2 and/or ACV3 are/is or can be opened electrically, and thus medium flows out of the secondary accumulator S2 in order to be withdrawn.

In order that no inadmissible pressure increase occurs in the event of leaks in the shut-off valve 210 or in the withdrawal valve 230, an overpressure valve 220 is integrated into the line 242 such that the overpressure valve opens, and opens up the connection to a relief line 240, when a pressure exceeds a value corresponding to the set spring force 221. Thus, the pressure accumulator vessel S2 is protected against an increase in pressure above the admissible operating pressure.

Figure 2:
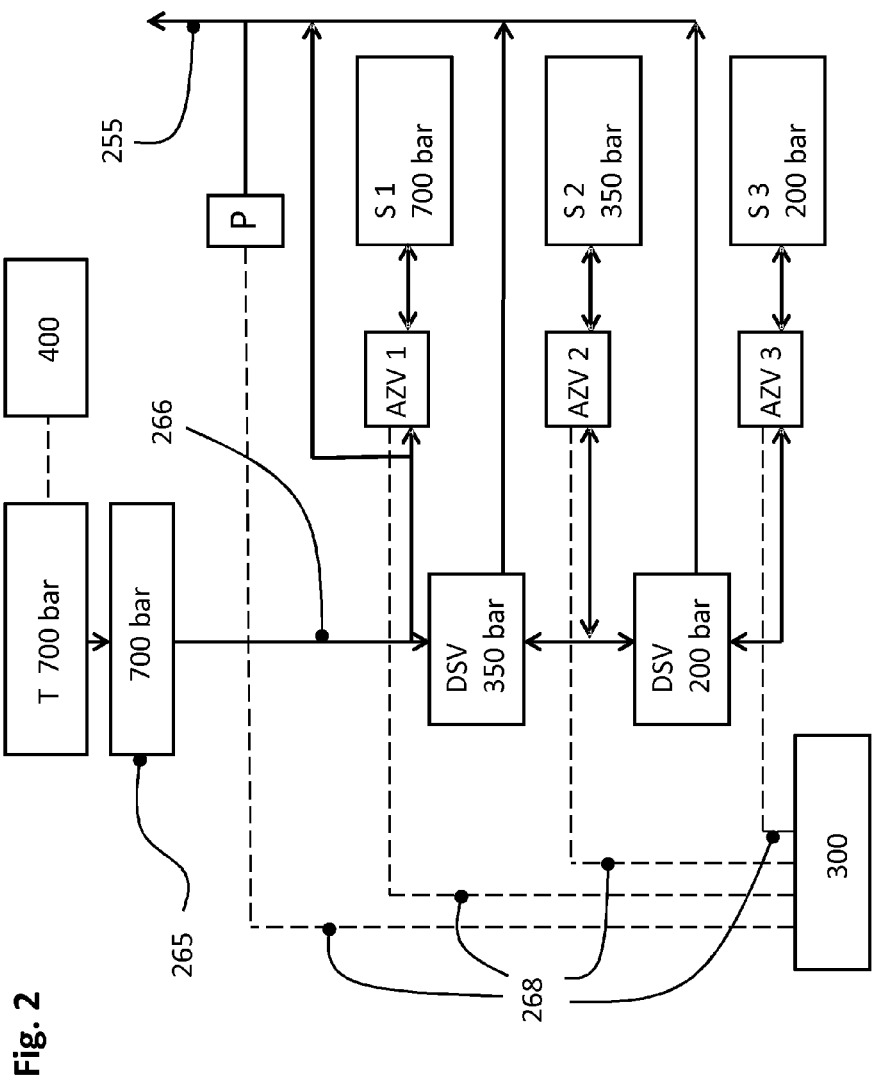
FIG. 2 illustrates a series connection of shut-off valves with different shut-off pressures for pressure limitation in secondary accumulators.

FIG. 2 illustrates a series connection of pressure shut-off valve units PSV with different shut-off pressures for pressure limitation in secondary accumulators. In the illustration, the control is configured such that, during the refueling process, when a system pressure of 200 bar is exceeded, the pressure shut-off valve unit PSV (shut-off pressure 200 bar) mechanically closes, and the downstream secondary accumulator S3 (admissible operating pressure 200 bar) with the automatic cylinder valve ACV is not subjected to any further increase in pressure. When a predetermined pressure, for example, of 350 bar is reached in the rest of the pressure accumulator system, the second pressure shut-off valve unit PSV (shut-off pressure, for example, of 350 bar) closes and protects the downstream secondary accumulator S2 (having an admissible operating pressure, for example, of 350 bar) and the PSV (having a shut-off pressure, for example, of 200 bar) against a further increase in pressure. The main accumulator S1 (having an admissible operating pressure, for example, of 700 bar) is filled until deactivation is triggered by the measurement system of the filling station 400 and/or by way of a signal from the pressure sensor P.

In accordance with ECE Guideline R110, during the refueling process, the automatic cylinder valves ACV1 to 3 are closed in the deenergized state, and the accumulators are filled via a bypass (with a check valve that opens only in the flow direction to the pressure accumulator vessel). When the vehicle is started up, only ACV1 may be opened electrically, and a withdrawal of gas 255 is permitted in the direction of low pressure via a pressure regulator. If the pressure in the main accumulator falls to 350 bar, the mechanical PSV (having a shut-off pressure, for example, of 350 bar) opens due to the pressure conditions. Furthermore, by way of the pressure sensor P, the pressure may be measured, a possible system enable condition for the pressure accumulator vessel S2 is identified, and, by way of the control unit 300, ACV2 is electrically actuated and opened. Gas is thus withdrawn from the pressure accumulator vessels S1 and/or S2. In the event of a further decrease in pressure below the exemplary 200 bar, the mechanical PSV (shut-off pressure 200 bar) opens and, under electrical actuation, ACV3 opens, and the stored medium can be withdrawn from all of the pressure accumulator vessels, wherein the ACVs may also be switched individually. Further pressure accumulator vessels are activated only in the event of an increased demand for stored medium.

Figure 3:
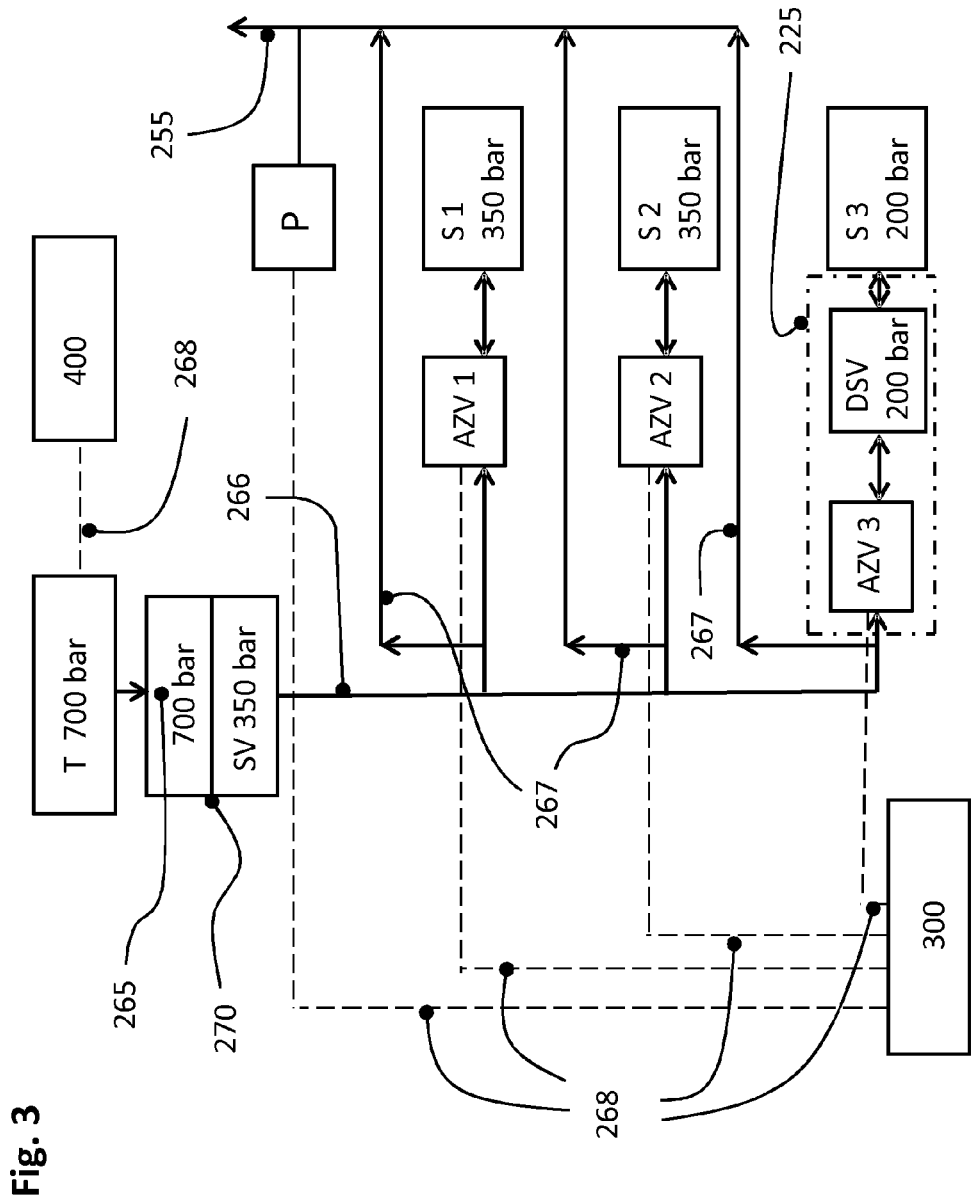
FIG. 3 illustrates a series connection of shut-off valves with different shut-off pressures for pressure limitation in a pressure accumulator system with main and secondary accumulators, and the integration of one shut-off valve into a tank neck unit.

FIG. 3 illustrates a series connection of different shut-off valves for pressure limitation in a pressure accumulator system with main and secondary accumulators, and the integration of one shut-off valve into a tank neck unit 270. As a result of the integration of one shut-off valve with a tank neck 265 in a tank neck unit 270, it is possible for the entire system to be protected against over-refueling, and for refueling to be performed precisely to the admissible operating pressure of the entire pressure accumulator system, in which shut-off valves for further reducing the maximum possible pressure for individual sub-accumulators are additionally installed in the system.

In FIG. 3, a pressure shut-off valve unit PSV (shut-off pressure 200 bar) between the automatic cylinder valve ACV3 and the secondary accumulator S3 (admissible operating pressure 200 bar) is integrated into an accumulator valve block 225. This offers the advantage that, during the refueling process, the maximum refueling pressure is maintained between ACV3 and PSV (shut-off pressure 200 bar) until ACV3 is electrically activated and opens. Only then is an opening of PSV 200 bar also permitted in the event of the set pressure being undershot.

Figure 4:
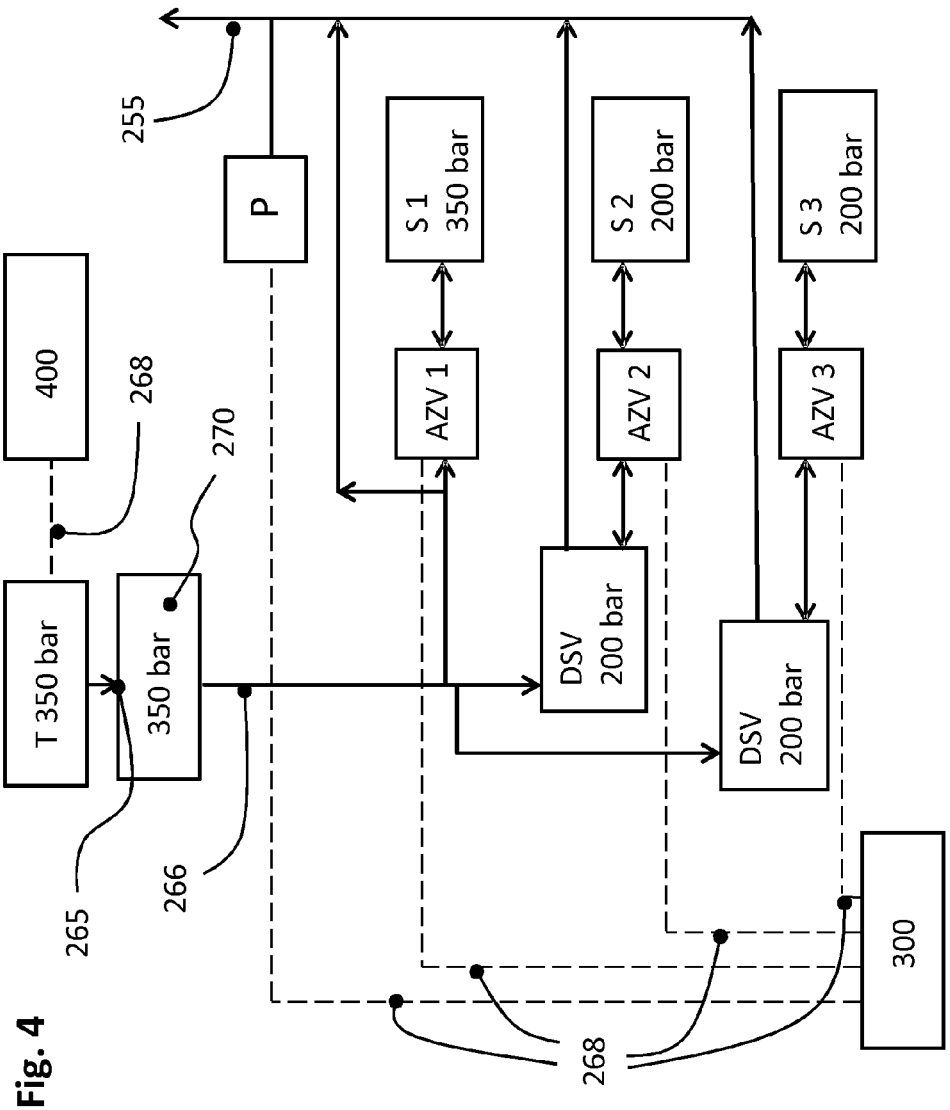
FIG. 4 illustrates a parallel connection of pressure shut-off valve units for the protection of various sub-accumulators.

The parallel connection of pressure shut-off valve units for the protection of various sub-accumulators as shown in FIG. 4 corresponds substantially to the example in FIG. 1, but has a parallel arrangement of the two separate pressure shut-off valve units PSV and pressure accumulator vessels S2, S3. The tank neck 265 is designed for refueling at a filling station T with a fuelling pressure of 350 bar.

As a result of the possibility of realizing different pressure levels in pressure accumulator systems, the use of different tank shapes and pressure accumulator vessel types is made possible, which permits the use of the most cost-effective possible pressure accumulator vessel corresponding to the respective pressure level.

Figure 5:
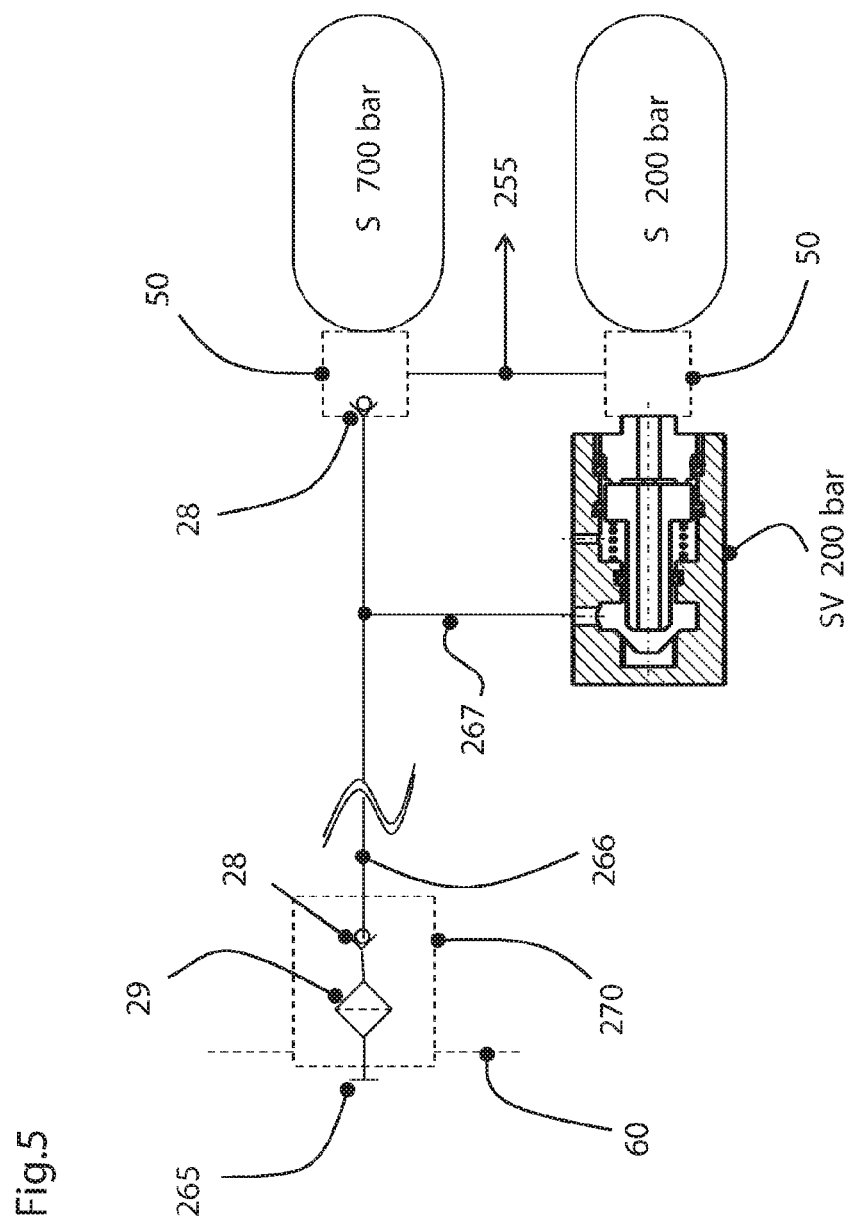
FIG. 5 illustrates a pressure accumulator system with a shut-off valve SV in an application with a parallel arrangement of two pressure accumulator vessels S and with the shut-off valve SV positioned upstream of an accumulator valve block.

FIG. 5 illustrates, by way of example, a pressure accumulator system with a shut-off valve SV in an application with a parallel arrangement of two pressure accumulator vessels S and with the shut-off valve SV positioned upstream of an accumulator valve block 50. The tank neck unit 270 is installed in a body 60 of a motor vehicle and has a tank neck 265. During the filling process, the medium flows through a filter 29 and a check valve 28 into the branched pressure line 266. One branch of the pressure line 266 leads via a first accumulator valve block 50 with installed check valve 28 into a pressure accumulator vessel S with admissible fill pressure of 700 bar. For the withdrawal of medium, the first accumulator valve block 50 additionally has a pressure regulator. The other branch leads into an inlet opening 10, which in this case is arranged radially, of a shut-off valve SV designed for a shut-off pressure of 200 bar. From the outlet opening 11 of the shut-off valve SV, medium now passes with a maximum pressure of 200 bar via a second accumulator valve block 50, which likewise has a pressure regulator for the withdrawal of medium, into a second pressure accumulator vessel S designed for an admissible fill pressure of 200 bar. By virtue of the shut-off pressure (200 bar) of the shut-off valve SV being coordinated with the admissible operating pressure of the second pressure accumulator vessel S, and the permanently connected arrangement of the components in the motor vehicle, reliable refueling is ensured regardless of the fuelling pressure of the filling station. Furthermore, in this way, in the case of low pressure, medium can be conducted to the consumer independently and simultaneously from each of the two pressure accumulator vessels S, despite different admissible pressure levels.

Figure 6:
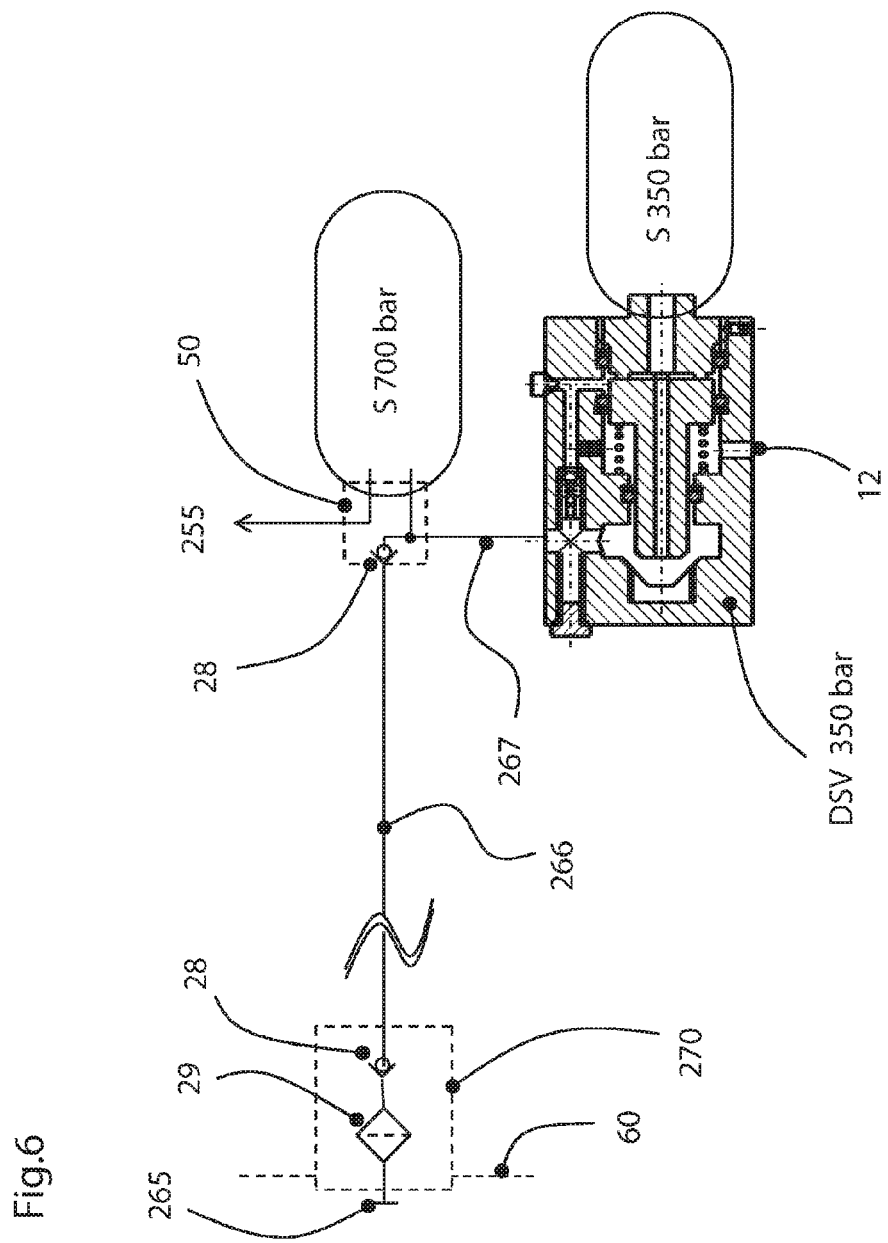
FIG. 6 illustrates a pressure accumulator system with a pressure shut-off valve unit PSV in an application with a parallel arrangement of two pressure accumulator vessels S with different admissible operating pressures.

FIG. 6 illustrates, by way of example, a pressure accumulator system in which the pressure line 266 leads, without branching, from the tank neck unit 270 to an accumulator valve block 50 of a first pressure accumulator vessel S (700 bar admissible operating pressure). From an inlet region of the accumulator valve block 50, a further pressure line 267 leads to a subordinate second pressure accumulator vessel S (350 bar admissible operating pressure), wherein the pressure shut-off valve unit PSV with integrated withdrawal valve, which is the subject of the invention, protects the pressure accumulator system by virtue of the fact that the pressure shut-off valve unit PSV closes when the preset 350 bar shut-off pressure is reached.

The pressure shut-off valve unit PSV opens only when the pressure in the first pressure accumulator vessel, and thus also in the connecting line between the pressure accumulator vessels, falls below the shut-off pressure (350 bar) of the pressure shut-off valve unit PSV as a result of the withdrawal of medium. The pressure accumulator system is evacuated to a consumer through a pressure regulator, which is integrated in the accumulator valve block 50, and through a pressure line 255. The pressure accumulator system illustrated in FIG. 6 has a very small number of separate components, and a simple topology of the pressure lines.

Figure 7:
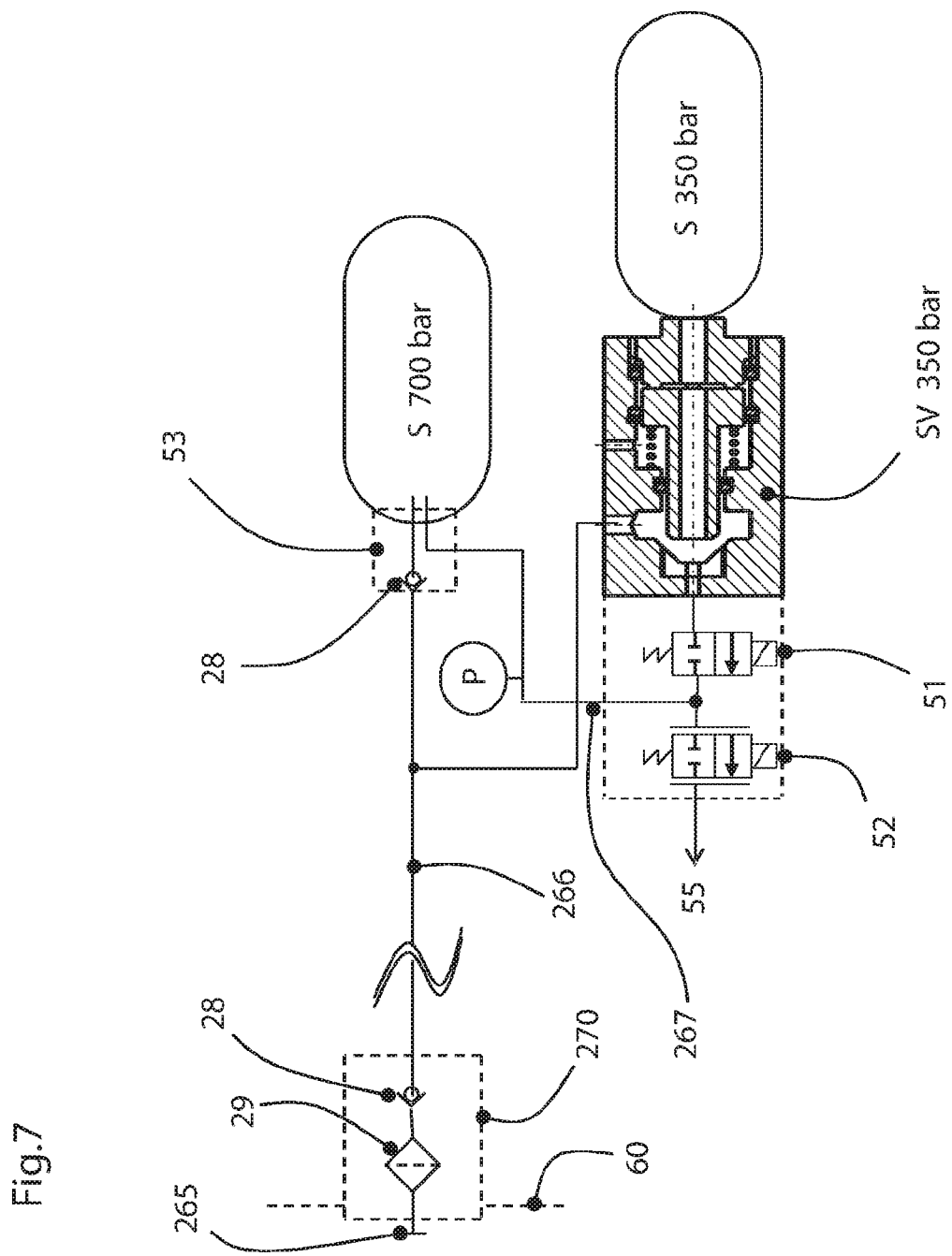
FIG. 7 is a schematic illustration of a further device for the refueling of a motor vehicle at a filling station with a fuelling pressure of 700 bar, including a pressure accumulator system with two pressure vessels with different admissible operating pressures.

FIG. 7 illustrates, by way of example, a pressure accumulator system having a combination of a shut-off valve SV with electromagnetically actuable valves in an application with a parallel arrangement of two pressure accumulator vessels S with different admissible operating pressures. The tank neck unit 270 is installed in a body 60 of a motor vehicle and has a tank neck 265. During the filling process, the medium flows through a filter 29 and a check valve 28 into the branched pressure line 266.

One branch of the pressure line 266 leads via a first accumulator valve block 53, with installed safety valve and check valve 28, into the first pressure accumulator vessel S with admissible fill pressure of 700 bar. For the withdrawal of medium, the first accumulator valve block 53 additionally has a pressure line 267, wherein the pressure line 267 leads, as withdrawal line, to a pressure regulator 52. The other branch of the pressure line 266 leads into an inlet opening 10, which in this case is arranged radially, of a shut-off valve SV which is designed for a shut-off pressure of 350 bar and which is connected by way of its outlet opening 11 directly to a second pressure accumulator vessel S with admissible fill pressure of 350 bar.

The shut-off valve SV illustrated in FIG. 7 additionally has, in the region of the sealing body, an opening that is connected to an electromagnetically actuable cut-off valve 51. The electromagnetically actuable cut-off valve 51 is in this case a solenoid valve that can be opened and closed electrically. A pressure regulator 52 is connected downstream of the electromagnetically actuable cut-off valve 51. The connecting line extending from the first pressure accumulator vessel S issues into the connecting line between the electromagnetically actuable cut-off valve 51 and the pressure regulator 52. The former connecting line has a pressure sensor P. The electromagnetically actuable cut-off valve 51 permits the withdrawal of medium from the second pressure accumulator vessel S with admissible fill pressure of 350 bar when the pressure in the connecting line has fallen below the shut-off pressure of the shut-off valve SV.

Figure 8:
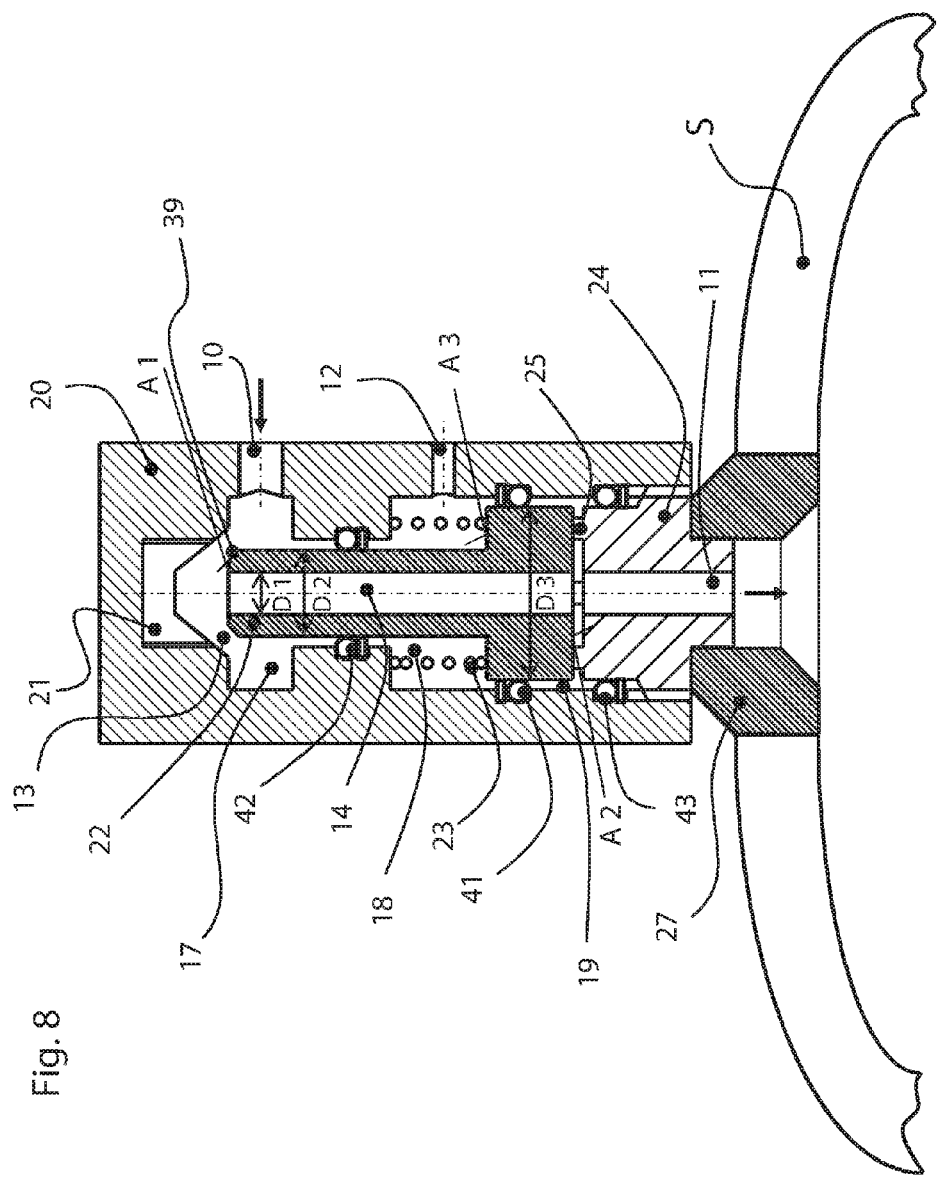
FIG. 8 illustrates a sectional view of an embodiment of a shut-off valve SV in accordance with embodiments.

As illustrated in FIG. 8, the shut-off valve is arranged in an opening of a pressure accumulator vessel S by way of a valve-holding block 27. Here, the expression "shut-off valve" refers to the totality of the parts of the pressure shut-off valve unit in accordance with embodiments that control the filling process. In a valve housing 20, there is mounted a piston 22 which has two sections with different outer diameters D2, D3 and which has a connecting duct 14, formed as a central hollow bore, with the inner diameter D1. At the transition to the larger outer diameter D3, the piston 22 is supported, by way of the support surface A3, on the valve housing 20 via a spring 23, whereby the piston 22 is held in abutment against the cover 24, and thus, in an unpressurized installation state, the passage opening 13 is held in an open position.

In FIG. 8, the cylindrical piston has two sections with different outer diameters D2 and D3. A first piston section has a first piston active surface A1 formed normally with respect to the axis of the piston 22, a sealing edge formed as a chamfer on one edge of the piston, and a first sliding surface with an outer diameter D2. A second piston section has a second piston active surface A2, a support surface A3 for the spring 23, and a second sliding surface with an outer diameter D3. The connecting duct 14 is formed as an axial bore over the entire length of the piston 22 and has an inner diameter D1. The connecting duct 14 connects the two piston active surfaces A1, A2 and is traversed by a flow of medium in accordance with the embodiment of the valve housing 20 and the operating state of the shut-off valve.

In the two sections with different outer diameters D2, D3, the piston 22 is sealed off by sealing elements 41, 42 such that the space with the spring 23 between the seals can "breathe" freely to atmospheric pressure through the ventilation opening 12. The sealing elements 41, 42 may optionally be mounted in the piston 22 or, as illustrated, in the valve housing 20. The seal 43 seals off the adjustable cover 24 with respect to the valve housing 20.

During a filling process, for example of a pressure accumulator vessel arranged at the outlet opening 11, medium can pass through the feed opening 10 in the inlet region 17 of the valve chamber, via the passage opening 13, and through the connecting duct 14 into the accumulator region 19 of the valve chamber, and consequently through the outlet opening 11 into the downstream pressure accumulator vessel S. If the pressure in the entire pressure accumulator system increases to such an extent that the spring force 23 is overcome due to the force conditions resulting from the pressure applied to the piston active surfaces A2 and A1 of the piston 22, the piston 22 is pushed against the sealing body 21. The shut-off valve closes. This pressure corresponds to the shut-off pressure.

In order that no further pressure force is exerted on the piston, it is therefore advantageous for the piston to provide a sealing action with respect to the sealing body 21 at the outer diameter D2. In the event of a pressure rise in the inlet region 17, the shut-off valve furthermore remains closed because the pressure increase no longer acts on the first piston active surface A1. When the pressure in the inlet opening 10 falls below the pressure at which the piston closed, the valve nevertheless remains closed because the closing force is determined by the pressure acting on the piston active surface A2 in the outlet opening 11 minus the spring force of the spring 23, and this state has not changed. It is thus possible for negative pressure to be applied to the inlet side 10 without the valve opening as a result. The spring force of the spring 23 can additionally be adjusted by means of the depth to which the cover 24 is screwed in. To obtain a good pressure distribution on the second piston active surface A2, it is necessary to provide either spacers 25 on the cover 24, or corresponding recesses on the piston.

Figure 9:
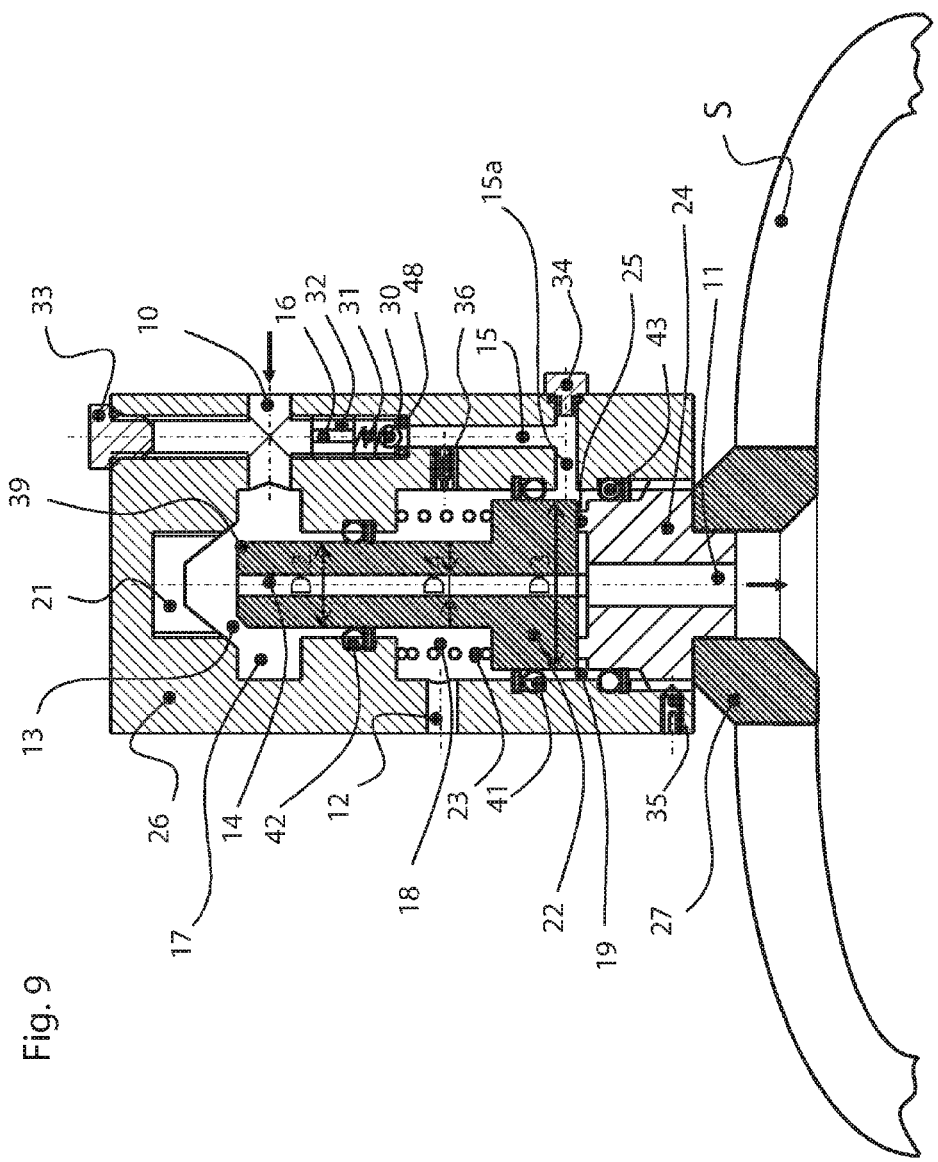
FIG. 9 illustrates a sectional view of a pressure shut-off valve unit PSV in accordance with embodiments, shdue the shut-off valve of FIG. 8 with additional valves installed.

FIG. 9 illustrates, by way of example, a complete pressure shut-off valve unit in accordance with embodiments. This comprises substantially all of the parts of the shut-off valve shown in FIG. 8, with the same reference signs being used. The modified valve housing is in this case denoted by the reference numeral 26 and has a withdrawal duct 15 which is illustrated by way of example between the accumulator region 19 and the feed opening 10 and in which there is arranged a withdrawal valve 30 which opens and closes in accordance with the pressure conditions. Advantageously, the withdrawal valve 30 may be embodied as a mechanical ball valve, in which, in an unpressurized state, the ball valve is permanently closed by a bias mechanism, such as, for example, a spring 31. If the pressure in the feed opening 10 falls below the pressure in the accumulator region 19 and thus in the withdrawal duct 15, 15*a*, the withdrawal valve 30 can open as a function of the spring force 31, and medium flows from the accumulator region 19 back to the feed opening 10 again through the withdrawal duct 15 and through the duct 16 in the spring fixing screw 32. Only in this way is a withdrawal of medium from the downstream pressure accumulator system made possible, assuming that the downstream pressure accumulator system has no further withdrawal devices.

As a further consequence, the pressure in the accumulator region 19 is depleted, and, as a function of the spring hysteresis of the spring 23 and the friction of the sealing elements 41, 42, the piston 22 of the shut-off valve is pushed downward, and the passage opening 13 opened up, after a time delay. As a result, in addition to the flow through the withdrawal valve 30, a return flow of the medium from the accumulator region 19 to the feed opening 10 is made possible through the connecting duct 14, which has a diameter D4. In this way, in turn, pressure equalization is produced between the accumulator region 19 of the valve chamber and the feed opening 10, and the withdrawal valve 30 closes again due to the spring force of the actuating spring 31. The feed flow rate and return flow rate can be adapted according to requirements by means of the bore diameter D4.

The seal 48 seals off a withdrawal valve 30, which is screwed in as an assembly, with respect to the valve body 26. The withdrawal valve may also be used in combination with electromagnetic valves and a pressure sensor P for any desired control of the time for the opening of the pressure shut-off valve unit. The securing of the screwed-in cover 24 and thus the reliable definition of the shut-off pressure may be realized in a technically conventional manner, for example, by way of a clamping screw 35. Necessary bores may be sealed off with respect to the outside by way of screws with sealing rings 33 and 34, as is likewise technically conventional.

A combination of a pressure shut-off valve unit with an overpressure valve 36 in a common valve housing 26 between the line on the withdrawal duct 15 and the relief region 18, which serves as a space for the spring 23, with relief opening 12. The reliable removal of escaping medium eliminates any further safety-critical factor.

The shut-off valve opens only when the pressure in the outlet opening 11 falls as a result of medium being withdrawn via a separate location in the downstream system, and the pressure thereby falling below the shut-off pressure. The shut-off valve either opens as a result of the pressure in the accumulator region 19 falling below the closing pressure of the shut-off valve due to withdrawal from the pressure accumulator vessel by the consumer, or is opened by way of the withdrawal valve 30 which is illustrated in FIG. 9 and which is arranged in the withdrawal duct 15, 15a.

A further embodiment of a shut-off valve SV in accordance with embodiments includes a variation of the embodiment illustrated in FIG. 8. The outlet opening 11, which in FIG. 8 is arranged in the cover 24, is relocated into the valve housing 20, in alignment with the movement axis of the piston 22, under the sealing body 23. The cover 24, without the outlet opening, now sealingly closes off the valve chamber. By way of an axial bore in the sealing body 23, which axial bore is in alignment with the new outlet opening in the valve housing 20, it is possible, when the valve seat is open, for medium to flow through the passage opening 13 and the axial bore in the sealing body 23 and through the new outlet opening, which is aligned with the movement axis of the piston 22, into a pressure accumulator vessel S fixedly connected to the outlet opening. The connecting duct 14, which is likewise in alignment with the movement axis of the piston 22, permits pneumatic or hydraulic communication of the medium with the second piston active surface A2, and has the effect that the shut-off valve closes when the predefined shut-off pressure is reached. The design variant of the shut-off valve according to the invention can be implemented in a particularly space-saving manner. It is, with suitable configuration of a withdrawal duct and of a withdrawal valve, suitable for being embodied as a pressure shut-off valve unit corresponding to FIG. 9.

In all embodiments in which a sealing body 21 is used, the sealing body 21 must, for safety reasons, be sealed off with respect to the valve housing 20 in order that no additional forces can be generated and act on the sealing edge of the piston 22.

Embodiments are suitable both for statically operated pressure accumulator systems and also for pressure accumulator systems in vehicles.

In accordance with embodiments, the designation of vehicle includes, for example, motor vehicles, rail vehicles, and also watercraft and aircraft. All of the pressure values stated are by way of example and do not in any way limit the invention and the pressure range for which embodiments is claimed.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

10 Feed opening
11 Outlet opening
12 Relief opening
13 Passage opening
14 Connecting duct
15, 15a Withdrawal duct
16 Duct
17 Valve chamber, inlet region
18 Valve chamber, relief region
19 Valve chamber, accumulator region
20 Valve housing
21 Sealing body
22 Piston
23 Spring
24 Cover
25 Spacer
26 Valve housing
27 Valve-holding block
28 Check valve
29 Filter
30 Withdrawal valve
31 Actuating spring
32 Spring fixing screw
33, 34 Closure elements
35 Clamping screw
36 Overpressure valve
39 Sealing edge
41, 42, 43 Sealing elements
48 Seal
50 Accumulator valve block with pressure regulator
51 Electromagnetically actuable cut-off valve
52 Pressure regulator
53 Accumulator valve block with safety valve
55 Pressure line to the consumer
60 Motor vehicle body
200 Pressure shut-off valve unit (PSV)
210 Shut-off valve
211 Spring force of the spring
220 Overpressure valve
221 Spring force
225 PSV combined with ACV
230 Withdrawal valve (spring-loaded ball valve)
240 Relief line
241, 242 Pressure lines
243 Control line
255 Withdrawal point
265 Tank neck
266, 267 Pressure lines
268 Electrical line
270 Tank neck unit
300 Control unit
400 Measurement system, filling station
A1, A2 First and second piston active surfaces
A3 Support surface
D1, D4 Inner diameter, connecting duct
D2, D3 Outer diameter, piston subsections
PSV Pressure shut-off valve unit
P Pressure sensor
S, S1, S2, S3 Pressure accumulator vessel
SV Shut-off valve
T Filling station (fuelling device)
ACV1, ACV2, ACV3 Automatic cylinder valves

What is claimed is:

1. A pressure accumulator system, comprising:
a tank neck;
pressure accumulator vessels, at least one of the pressure accumulator vessels having an admissible operating pressure that is lower than an admissible operating pressure of another pressure accumulator vessel;

a valve unit to prevent an inadmissible increase in pressure at the pressure accumulator vessels, the value unit includes a shut-off valve, a check valve, and an overpressure valve each arranged in a common valve housing, wherein the valve unit has a shut-off pressure defined by the lower admissible operating pressure; and an electronic pressure measurement device and a control unit each operatively connected to the valve unit.

2. The pressure accumulator system of claim 1, wherein the valve unit comprises:

the valve housing;

a valve chamber with an accumulator region, a feed opening and an outlet opening which faces toward the pressure accumulator vessels;

a piston having at least one axial connecting duct, a first effective piston surface facing an inlet region of the valve chamber and a second effective piston surface adjacent to the accumulator region, the piston being configured to axially move in the valve chamber during a change in pressure in the accumulator region;

at least one spring;

sealing elements configured to guide the piston for axial movement in the valve chamber;

a sealing body;

a passage opening arranged between the intake opening and the outlet opening, the passage opening configured to reversibly open and close during the change in pressure in the accumulator region, and, in an unpressurized state, is kept open by the bias mechanism;

a valve set formed by the first effective piston surface and the sealing body, or the valve housing; and a duct configured to connect the accumulator region to the inlet region of the valve chamber.

3. The pressure accumulator system of claim 2, wherein the first effective piston surface and the sealing body are configured such that, when the piston is in a closed position, a sealing action is generated at a sealing edge in a region of an outer rim of the first effective piston surface.

4. The pressure accumulator system of claim 2, wherein the first effective piston surface and the valve housing are configured such that, when the piston is in a closed position, a sealing action is generated at a sealing edge in a region of an outer rim of the first effective piston surface.

5. The pressure accumulator system of claim 2, wherein the shut-off pressure of the valve unit corresponds to the spring force of the spring and the first and second effective piston surfaces.

6. The pressure accumulator system of claim 1, wherein the pressure accumulator vessels comprise at least two pressure accumulator vessels arranged in parallel with respect to one another.

7. The pressure accumulator system of claim 1, wherein the pressure accumulator vessels comprise at least two pressure accumulator vessels arranged in series with respect to one another.

8. The pressure accumulator system of claim 1, the at least one electronic pressure measurement device is arranged between the tank neck and a withdrawal point.

9. A pressure accumulator system, comprising:

a tank neck;

at least two pressure accumulator vessels, at least one of the pressure accumulator vessels having an admissible operating pressure that is lower than a maximum applicable pressure at the tank neck;

at least one upstream device to protect the at least one of the pressure accumulator vessels against an inadmissible pressure rise, the at least one upstream device having a shut-off pressure defined by the lower admissible operating pressure, the at least one upstream device comprising a mechanical shut-off valve which, owing to a set spring force, is to sealingly close off a passage opening when a pressure of the at least one pressure accumulator vessel exceeds a predetermined value, and which does not open due to either a further increase in pressure, or a further decrease in pressure down to negative pressure, in a feed opening of the mechanical shut-off valve, that is to be connected upstream;

pressure lines; and at least one withdrawal point.

* * * * *